N. EVINGER.
ROAD SCRAPER.
No. 65,659.
PATENTED JUNE 11, 1867.
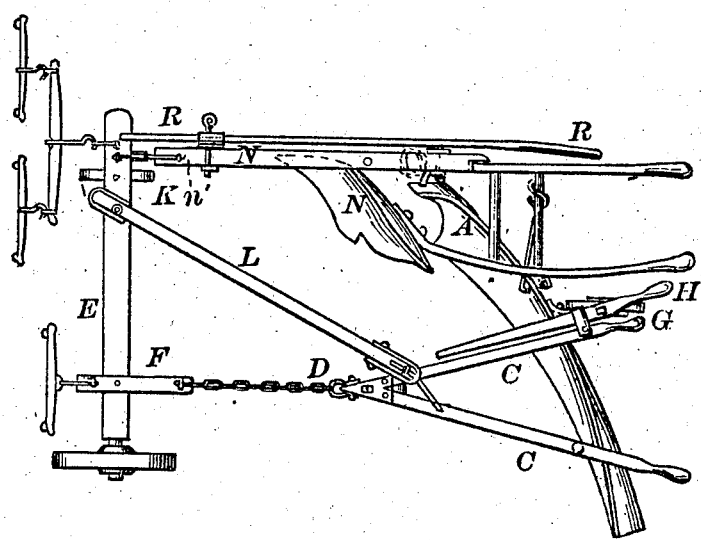
ONLY DRAWING ACCESSIBLE
TAKEN FROM PATENT OFFICE REPORT
1867 - VOL. III.

United States Patent Office.

N. EVINGER, OF SAND FORD, INDIANA.

Letters Patent No. 65,659, dated June 11, 1867.

---

IMPROVED ROAD-SCRAPER.

---

The Schedule referred to in these Letters Patent and making part of the same.

---

TO ALL WHOM IT MAY CONCERN:

Be it known that I, N. EVINGER, of Sand Ford, in the county of Vigo, and State of Indiana, have invented a new and useful improvement in Road-Scraper; and I do hereby declare that the following is a full, clear, and exact description thereof, which will enable others skilled in the art to make and use the same, reference being had to the accompanying drawings, forming part of this specification, in which—

Figure 1 is a top view of my improved scraper.

Figure 2 is a side view of the same.

Similar letters of reference indicate like parts.

My invention has for its object to furnish an improved road-scraper, so constructed and arranged that it may be attached to and used in connection with an ordinary plough; and it consists in the combination and arrangement of its various parts so as to adapt it for use in connection with an ordinary plough.

A is the scraper-blade, which is made in such a shape as to take the dirt loosened by the plough and spread it over the roadway. The scraper-blade is held in proper position by being attached to the lower ends of the uprights B, the upper ends of which are attached to the beams C. The rear ends of the beams C have handles formed upon or attached to them, and their forward ends meet in front of the scraper A, at which point the rear end of the draught-chain D is attached to them, the forward end of which is attached to the bar E, or to a short bar, F, pivoted to the bar E. G is a caster-wheel pivoted to the arm H, the forward end of which is pivoted to the side of the beam C, and the rear part works in a keeper, I, and is held in any desired position by a pin passing through the said keeper and through the said arm H. This enables the scraper to be adjusted with its lower edge at any desired distance above the surface of the ground over which it is passing. Upon one end of the bar E is formed an axle for the wheel J, and beneath its other end is pivoted the caster-wheel K. L is a connecting-bar, the forward end of which is pivoted to the bar E, and its rear end to the beam C, by a pin passing through a slot in the end of the said bar, so that it may have sufficient play to allow the relative position of the scraper to be adjusted by lengthening or shortening the chain D. M is a caster-wheel, pivoted to the beams C at the point where they meet to support them. N is an ordinary plough, the forward end of the beam $n'$ of which is connected to the draw-bar E, as shown in fig. 1. The forward end of the scraper-plate A is attached to the plough N, so as to be drawn by it by a chain, O, attached to the forward end of the said scraper-plate and passed around the upright, by means of which the plough N is attached to the beam $n'$. The height of the forward end of the scraper-plate A above the ground is regulated by the adjusting-bar P, the lower end of which is pivoted to the said scraper, and its upper end attached to the beam $n'$ by a pin passing through one or the other of the holes formed in the said adjusting-bar and into a hole in the said beam $n'$. R is a lever, which is pivoted to the forward part of the plough-beam $n'$ by means of a removable clasp, S, with its forward end in contact with the end of bar E, so that by raising the free end of the said lever the plough N may be raised from the ground.

This arrangement, together with the arrangement of the arm H, caster-wheel G, and beam C, enables the plough and scraper-blade to be raised from the ground, so that the machine may be drawn upon its wheels G M J K, whenever desired.

What I claim as new, and desire to secure by Letters Patent, is—

1. The combination and arrangement of the scraper-plate A, beams C, chain D, draught-bar E, and connecting-bar L, with an ordinary-plough, N, substantially as herein shown and described.

2. The combination of the pivoted arm H and caster-wheel G with the beam C, substantially in the manner herein shown and described and for the purpose set forth.

3. The combination of the lever R with the plough-beam $n'$ and draught-bar E, substantially as herein shown and described and for the purpose set forth.

N. EVINGER.

Witnesses:
WM. B. RUSH,
BENJ. EVINGER.